March 7, 1961 R. N. ROWE 2,974,234
DYNAMOELECTRIC DEVICE
Filed Oct. 10, 1958 2 Sheets-Sheet 1
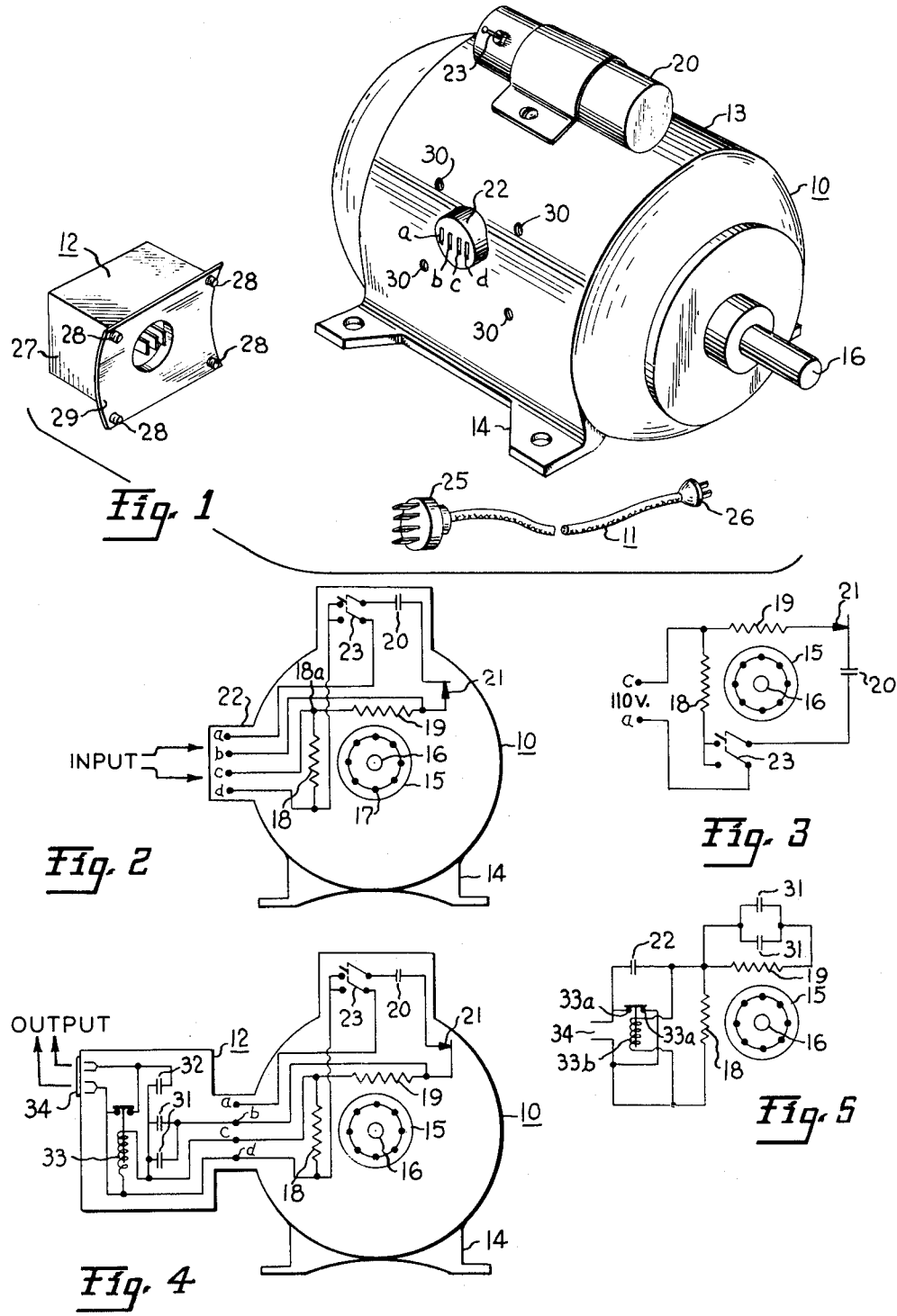

March 7, 1961  R. N. ROWE  2,974,234
DYNAMOELECTRIC DEVICE

Filed Oct. 10, 1958  2 Sheets-Sheet 2

United States Patent Office 2,974,234
Patented Mar. 7, 1961

2,974,234

DYNAMOELECTRIC DEVICE

Raymond N. Rowe, New Britain Ave., Plainville, Conn.

Filed Oct. 10, 1958, Ser. No. 766,575

9 Claims. (Cl. 290—31)

My invention relates to dynamoelectric devices and particularly to devices which are usable selectively as an electric motor and as a generator of electric power.

Prior art devices usable both as motors and electric power generators have been primarily restricted to direct-current applications, or have been of excessive cost because of their highly specialized construction.

It is an object of the present invention to provide a dynamoelectric device usable selectively as an induction type alternating current motor, and as an alternator, i.e., a generator of alternating-current power.

It is another object of the invention to provide a device of the type described which utilizes a basic construction of relatively low cost by reason of the similarity of its physical structure to that of conventional alternating motor devices, for which manufacturing facilities are in general existence.

It is another object of the invention to provide a device of the type described which may be quickly and easily converted from one type of dynamoelectric device to the other.

It is another object of the invention to provide an alternator having an output voltage which remains substantially constant over a wide range of loading.

It is a further object of the invention to provide an alternator which is substantially smaller and less expensive than prior art alternators of comparable electrical rating.

In accordance with the invention, there is provided a dynamoelectric device including a squirrel-cage induction type rotor, a main field winding, an auxiliary field winding, and first and second capacitance means. Means is further provided for connecting the field windings and the capacitance means selectively in a desired one of two relationships. In the first such relation, the auxiliary field winding is connected electrically in series with the first capacitance means across a pair of terminals, and the main field winding is connected in parallel with this combination. In this condition, the device may be operated as an induction motor by the application of an alternating-current voltage across the said terminals.

In the second relation, the main winding is connected in series with the second capacitance means across a pair of terminals, and the first capacitance is connected across the auxiliary winding to form a closed-loop circuit essentially independent electrically of the main winding and the terminals. When connected in this relation, the device may be used as an alternator by driving the rotor, to produce a stable alternating-current voltage across the said terminals.

My invention will be better understood from the following detailed description, taken in conjunction with the appended drawings, and its scope will be pointed out in the appended claims.

In the drawings:

Figure 1 is an exploded perspective view of a dynamoelectric device incorporating the invention;

Figure 2 is a schematic illustration of the basic unit portion of the invention, shown as adapted to serve as an alternating-current motor;

Figure 3 is a simplified schematic, showing the components used when the device is used as a motor, and their interconnection;

Figure 4 is a schematic illustration of the invention according to Figure 1, shown as adapted to serve as an alternator;

Figure 5 is a simplified schematic illustration showing the components used when the device is used as an alternator, and their interconnection;

Figure 7:
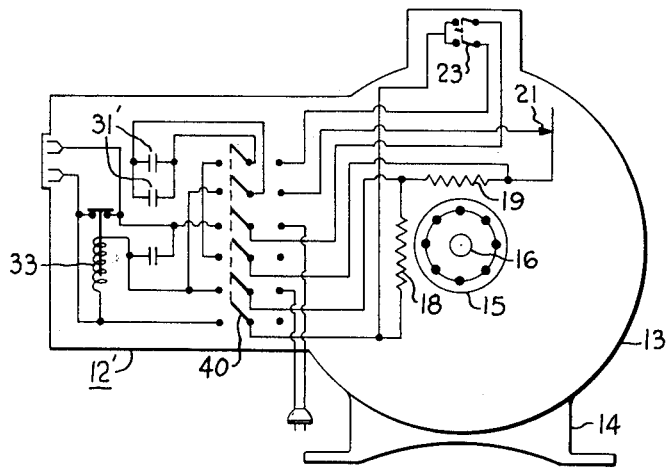
Figure 7 is a schematic illustration of still another embodiment of the invention.

The invention is shown in Figures 1–5 as incorporated in a dynamoelectric device comprising a basic unit portion 10, an electric power connecting cable assembly 11 for use with the basic unit 10 to provide an electric motor, and an alternator-adapter assembly 12, for use with the basic unit 10 to provide an alternator.

The basic unit assembly 10 includes a housing portion 13 having a mounting base 14. The unit 10 further includes a rotor 15, see Figure 2, of conventional "squirrel-cage" construction, comprising a generally cylindrical member of laminated ferromagnetic material, supported upon a shaft 16 for rotation about its major axis and having a plurality of conductors 17 embedded in the peripheral portion thereof extending generally parallel to the major axis and having their ends connected electrically in common. Also contained in the unit 10 are a pair of motor windings comprising a main winding 18 and an auxiliary winding 19. The auxiliary winding 19 is positioned within the housing 13 at a location displaced 90 electrical degrees away from the main winding 18 with respect to the axis of the rotor 15, as indicated schematically in Figures 2 and 4. The main and auxiliary windings also have ferromagnetic core members, not shown, associated therewith, of conventional laminated construction and having pole portions disposed adjacent the rotor 15.

For the purpose of providing a phase displacement of the current in the auxiliary winding approximately 90 electrical degrees with respect to that of the main winding, a capacitor 20 is provided, mounted on the enclosure 13. A centrifugal switch 21, also of conventional construction, is also provided, connected in series with the winding 19 for the purpose of disconnecting this winding and the capacitor when the rotor has reached a predetermined speed, such as 75% of full speed. A switch 23 is provided for starting and stopping the motor.

The construction of the basic unit as thus far described is similar to that of a conventional single-phase induction motor such as used in 60-cycle, 110–120 volt circuits. In accordance with the present invention, however, the basic unit 10 includes means by which it is adapted to be used selectively as an induction motor or to be easily and quickly converted to an alternator which, when driven at the proper speed, will deliver alternating-current power such as 60-cycle, 110–120 volt power, such as for emergency use or for portable power supply purposes.

For this purpose there is provided a multiple-contact socket 22, mounted on the housing 13 of the basic unit 10 and having terminals $a$, $b$, $c$, and $d$, and a double-pole single-throw switch 23, mounted in the same enclosure as capacitor 20.

As shown in Figure 2, the main and auxiliary windings have a common connection point 18a which is connected to terminal c of the socket 22. The outer end of the auxiliary winding is connected to the terminal b, while the outer end of the main winding is connected to terminal d. Terminal a of the socket 22 is connected to one pole of the switch 23, the other pole of the switch serving to control a connection from the capacitor to the output end of the main winding.

To permit the use of the basic unit 10 as a motor, an adapter cable assembly 11 is provided, including a connector 25 having four contact prongs, two of which may be dummies or for polarizing purposes, and the other two of which are connected to a connector 26 of conventional construction having two contact prongs and adapted for connection to a source of power such as 60-cycle, 110–120 volt power.

When the adapter assembly 11 is connected to socket 22, the effective connections provided in the basic unit are as illustrated in simplified form in Figure 3, in which the main winding is connected directly across the terminals a and c of the socket, while the series combination of the start winding, the capacitor 20, and the centrifugal switch 21, are in parallel with the main winding and therefore also directly across the terminals a and c. In this condition, the device may be used as an alternating current motor of the induction type and exhibits all the characteristics of a conventional motor of this type.

When it is desired to use the basic unit 10 as an alternator, the motor starting switch is turned to its "off" or open position, the plug 25 is removed, and the alternator-adapter assembly 12 is plugged into the socket 22. The adapter 12 comprises a housing portion 27 which is adapted to be attached to the housing 13 of the unit 10 by suitable means such as by means of screws 28 which are preferably trapped in place in flange portions 29 of the housing 27 and received in holes 30 of the housing 13.

As shown in Figure 4, the adapter 12 contains two field-exciter capacitors 31, a series capacitor 32, a relay 33, a receptacle type output socket 34, and contacts b, c, and d, corresponding to similarly lettered contacts of the socket 22. As shown, the capacitors 31 are connected in parallel and across the socket terminals b and c, while the terminals a and d are connected respectively to the terminals of the output socket 34. In addition, the relay 33 has its coil connected across terminals c and d and has its contacts connected across the terminals of the output socket 34.

It will be observed that as thus adapted, the capacitor 20 and the centrifugal switch 21 are effectively removed from the circuit. The effective circuit of the device thus is as shown schematically in Figure 5. In this condition, when the rotor 15 is driven at a predetermined constant speed, an alternating current voltage of predetermined frequency is generated in the winding 18, which voltage is made available through series capacitor 32, at socket 34 for external use.

The individual turns of the auxiliary winding 19 are preferably connected in parallel so that the voltage appearing across this winding when operating is relatively low. This permits the use of capacitors 31 of relatively low cost, such as electrolytic capacitors, which would not be feasible if high voltages were involved.

In a particular embodiment of the invention, a basic unit having a rating of ¼ horsepower at 110 volts and 1725 r.p.m. as a motor was used with two 60-volt 240 v.a., 175 mfd. electrolytic capacitors as capacitors 31, and a capacitor of the same type and rating was used as capacitor 32.

Figure 6:
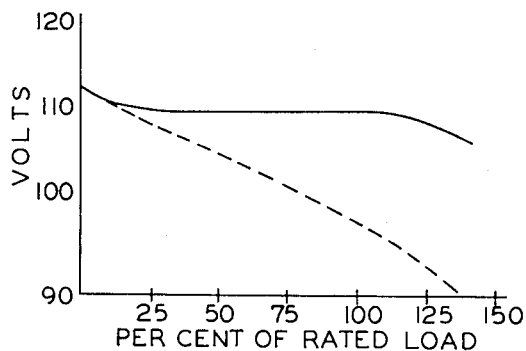
Figure 6 is a graph showing the electrical characteristics of one embodiment of the invention when operated as an alternator.

The capacitor 32, in series with the load, serves to stabilize the output voltage of the alternator under load, giving it characteristics similar to those of a compound-wound D.-C. generator. In Figure 6 there is shown a graph indicating the relation of output voltage to degree of loading in the embodiment referred to above. As shown in this graph, the output voltage provided by the alternator of the invention, remains substantially constant from 25 to over 125% of rating, with a unity power factor load. For purposes of comparison, there is shown in dotted line, the comparable load vs. voltage characteristics of a conventional alternator. Moreover, the size and weight of this alternator provided in accordance with the invention is only about one-half the size and weight of a conventional alternator.

While the exact theory of operation of the device is not completely understood, it is believed that the action is similar to that of an induction alternator. The auxiliary winding 19 thus becomes an exciter winding, with current flowing around the closed loop comprising the winding 19 and the capacitors 31. Such current is initially generated by the action of residual magnetism in the rotor 15. The exciting current flowing in the winding 19 causes magnetic poles to become established in the rotor 15 by reason of currents induced in its squirrel-cage windings. Such poles create rotating magnetic fields which cut the main winding 18, inducing the voltage which appears across the output terminals. The main winding 18 also contributes to excitation to some degree, it is believed.

The action of the capacitor 32 is such as to stabilize the output voltage when the device is used as an alternator. It has been determined by experiment, that the presence of such capacitance is essential to the maintenance of desirable regulation characteristics of the device.

Under certain conditions of loading, it has been found that excitation of the rotor 15, and, therefore, the output voltage, may disappear. It has been discovered however, that such excitation may be quickly restored by short-circuiting the load for a short instant of time. For this purpose, the relay 33 is provided, having its contacts 33a directly across the output terminals 34. The relay contacts 33a are normally closed, thereby normally short-circuiting the load. The control coil 33b of the relay 33 is connected across the winding 18, so that as soon as the voltage across the winding builds up sufficiently, the relay opens, inserting the load. Thus if, under use conditions, the excitation dies out, the relay 33 immediately closes, excitation is restored, and the relay immediately reopens.

In the embodiment of the invention shown in Figure 7, a unitary assembly is provided and the conversion from an A.C.-motor to an alternator is accomplished by a simple switching operation.

In accordance with this form of the invention, the rotor 15, windings 18 and 19, switch 23, and centrifugal switch 21 are similar to the corresponding components in the form of Figures 1–6. An auxiliary housing portion 12', however, is permanently attached to the housing 13 and contains components corresponding to those of the adapter unit 12 of the previous form. The capacitors 31' however, in this form, are adapted to serve both as the motor starting capacitance when the unit is used as a motor, and as the exciter capacitance when the unit is used as an alternator.

For this purpose, a six-pole double-throw switch 40 is provided for altering the circuit connections from those corresponding in effect to the circuit shown in Figure 3 when the switch is closed in the right hand direction as illustrated, to permit use as a motor, to those corresponding in effect to the circuit shown in Figure 5 when the switch is in the opposite position, to permit use as an alternator. In both the form of Figures 1–6 and the form of Figure 7, the motor starting switch 23 must be in the open position when the device is used as an alternator. For this purpose, the operating members of the switches 40 and 23 may advantageously be ganged together by suitable means, not shown, to ensure that when the switch 40 is closed in the left-hand direction for use as an alternator, the motor starting switch 23 will be open.

Figure 8:
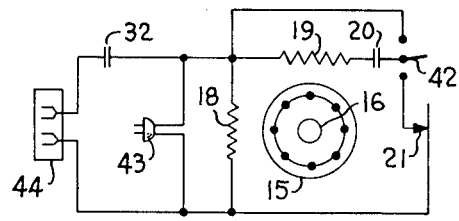
Figure 8 is a schematic illustration of a third embodiment of the invention.

In Figure 8 there is shown the schematic diagram of another embodiment of the invention, in which one single-pole double-throw switch 42 serves to change the device over from a motor to an alternator. In this embodiment, a connector 43 is provided having terminals connected to the opposite ends of the main winding 18 and adapted to be plugged into a conventional socket providing alternating-current power, such as 110–120 volts, 60-cycle. An alternator output socket 44 is provided, connected in series with a capacitance 32 across the winding 18. The single-pole double-throw switch 42 serves to connect the capacitance 20 selectively to the centrifugal switch 21 for operation of the device as a motor, and to the common point of windings 18 and 19 for operation of the device as an alternator. The relay 33 has been omitted in this embodiment although such relay may, of course, be used in accordance with the connections and for the purpose described above, and provided with suitable switching means for removing it from the circuit when the device is operated as a motor.

Figure 9:
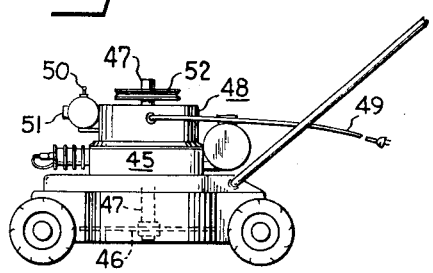
Figure 9 is an elevation view of a gasoline-engine-driven mower of the rotary type equipped with a motor-alternator in accordance with the invention.

In Figure 9 is shown a mower of the rotary type, including a gasoline-engine 45 of conventional construction disposed and arranged to drive a cutting blade 46 mounted on an output shaft 47. A motor-alternator 48, in accordance with the present invention is mounted on the engine 45, and has its motor mounted on an integral extension of the shaft 47. In this embodiment, the motor-alternator 48 is proportioned to be of relatively large diameter and short length to provide relatively high starting torque.

In use, the power cord 49 is connected to a source of 110-volt 60-cycle power, and the device 48 is started as a motor by closing starting switch 50, thus starting the gasoline engine 45. After the gasoline engine 45 is started, the cord 49 is disconnected, and the switch 50 is thrown to its opposite position. The engine thereafter serves to drive the device 48 as an alternator, and the assembly may be used in the usual way as a mower, or used as a portable source of alternating-current power, made available at output socket 51. In addition, the assembly may be used as an emergency source of alternating-current power, since the gasoline engine may also be started manually in the usual manner by means of a starting cord wound around the pulley portion 52.

While I have shown only specific embodiments of the invention, it will be appreciated that many modifications thereof may readily be made by those skilled in the art. It is therefore intended by the appended claims to cover all such modifications as fall within the true spirit and scope of the invention.

I claim:

1. A dynamoelectric device comprising an enclosure, a squirrel-cage type induction rotor rotatably supported in said enclosure, a main field winding in said enclosure, an auxiliary field winding in said enclosure, capacitance means, means for connecting said field windings and said capacitance means in a first relation for operation of said device as a motor and in a second relation for operation of said device as an alternator, said auxiliary winding in said first relation being connected electrically in series with at least a portion of said capacitance means across said main winding, said auxiliary winding in said second relation being connected electrically in parallel with at least a portion of said capacitance means to form a closed loop circuit electrically independent of said main winding for operation of said device as an alternator, and means for selectively making external electrical connection directly across said main winding to apply an externally generated voltage thereto and for making external connection to said main winding with at least a portion of said capacitance means in series with said external connection and said main winding.

2. A dynamoelectric device comprising a main enclosure, a squirrel-cage type induction rotor rotatably supported in said enclosure, a main field winding in said enclosure, an auxiliary field winding in said enclosure having one end thereof connected to said main field winding, auxiliary capacitance means carried by said enclosure, output terminal supporting means carried by said enclosure and having a plurality of connecting terminals available for connection of external conductors thereto and comprising terminals connected directly to the ends of said windings and to the common point of interconnection of said windings, and switch means carried by said enclosure for selectively connecting and disconnecting said capacitance between the ends of said windings remote from their interconnected ends, said device also including supplementary enclosure means, second auxiliary capacitance means in said supplementary enclosure, series capacitance means in said supplementary enclosure, first terminal supporting means carried by said supplementary enclosure and carrying a pair of output terminals, second terminal supporting means carried by said supplementary enclosure and carrying a plurality of input terminals thereon, means for mounting said supplementary enclosure means on said main enclosure with terminals of said input terminal means connected to corresponding terminals of said output terminal supporting means of said main enclosure so that said second auxiliary capacitance means is connected across said auxiliary winding to form a closed loop circuit and said output terminals of said supplementary enclosure connected across the series combination of said series capacitance and said main winding.

3. A dynamoelectric device comprising an enclosure, a squirrel-cage type induction rotor rotatably supported in said enclosure, a main field winding in said enclosure, an auxiliary field winding in said enclosure having one end connected to one end of said main winding in common, auxiliary capacitance means having one terminal thereof connected to the end of said auxiliary winding opposite from said common connection, switch means for connecting the other terminal of said capacitance means selectively to said common connection for operation of said device as an alternator and to the end of said main winding opposite from said common connection for operation of said device as an induction motor, a first pair of externally accessible terminals carried by said enclosure and connected to the opposite ends of said main winding respectively, for connection to an external source of electric power to operate said device as a motor, and a second pair of externally accessible terminals one of which is connected directly to one end of said main winding and the other of which is connected in series with said series capacitance to the other end of said main winding for operation of said device as an alternator.

4. A dynamoelectric device as set forth in claim 1 wherein said device also includes a relay having its coil connected across said main winding and having a pair of normally-closed contacts connected to the opposite ends of said main winding respectively so as to normally short-circuit said winding, said relay being actuated to open said contacts upon the occurrence of predetermined voltage in said main winding.

5. A dynamoelectric device as set forth in claim 3 wherein said device also includes normally-closed centrifugal switch means disposed to be actuated to open condition upon predetermined rotation of said induction rotor and connected to form when closed part of the electrical connection between said auxiliary capacitance and said main winding when said device is operated as an induction motor.

6. An alternator comprising an enclosure, a squirrel-cage type induction rotor rotatably supported in said enclosure, a main field winding in said enclosure, an exciter winding in said enclosure, a first capacitance means connected in shunt relation to said exciter winding, a pair of output terminals, and second capacitance means connected in series relation with at least one of said output terminals and said main field winding.

7. An alternator comprising an enclosure, a squirrel-cage type induction rotor rotatably supported in said enclosure, a main field winding in said enclosure, an exciter winding in said enclosure, first capacitance means connected in shunt relation to said exciter winding, a pair of output terminals, second capacitance means connected in series relation with at least one of said output terminals and said main field winding, and relay means having a pair of control circuit terminals connected to said output terminals respectively and a pair of signal source terminals connected to derive a voltage from said main field winding, said relay means being adapted to maintain a closed circuit between said control circuit terminals in the absence of a predetermined voltage across said signal source terminals and to maintain an open circuit between said control circuit terminals in the presence of said predetermined voltage across said signal source terminals, whereby to substantially short-circuit said output terminals of said device in the absence of said predetermined voltage across said main field winding.

8. In combination, an internal combustion engine having a power output shaft adapted to deliver power from said engine for external use, said engine being adapted to be started by rotation of said output shaft, a dynamoelectric device comprising an enclosure, a squirrel-cage type induction rotor within said enclosure and fixedly connected to said output shaft for rotation therewith, a main field winding in said enclosure, an auxiliary field winding in said enclosure, capacitance means, means for connecting said auxiliary winding in a first condition in series with at least a portion of said capacitance, a pair of input terminals for applying an externally generated alternating current voltage to said main field winding when said auxiliary winding is connected in said first condition for operating said device as a motor to start said engine, means for connecting said auxiliary winding in a second condition in parallel with at least a portion of said capacitance for operation of said device as an alternator, a pair of output terminals for connecting said main field winding to external power consuming means, series capacitance means connected in series between at least one of said output terminals and said main field winding, and means for applying an external mechanical force to said shaft to mechanically start said engine in the absence of an available external alternating voltage power source.

9. A dynamoelectric device comprising an enclosure, a squirrel-cage type induction rotor rotatably supported in said enclosure, a main field winding in said enclosure, an auxiliary field winding in said enclosure, first and second capacitance means, means for connecting said field windings and said first capacitance means in a first relation for operation of said device as a motor and in a second relation for operation of said device as an alternator, said auxiliary winding in said first relation being connected electrically in series with said first capacitance means across said main winding, said auxiliary winding in said second relation being connected electrically in parallel with said first capacitance means to form a closed loop circuit having not more than one point of connection with said main winding for operation of said device as an alternator, a first plug-in type connector including a pair of terminals connected directly to the ends of said main winding respectively for applying an externally generated voltage thereto for operating said device as a motor when said windings are connected in said first relation, and a second plug-in type connector including a pair of terimals one of which is connected directly to one end of said main winding and the other of which is connected in series with said second capacitance means to the other end of said main winding for operating said device as an alternator when said windings are connected in said second relation.

References Cited in the file of this patent

UNITED STATES PATENTS

| 715,546 | Bradley | Dec. 9, 1902 |
| 2,613,342 | Thompson et al. | Oct. 7, 1952 |